Figure 3:
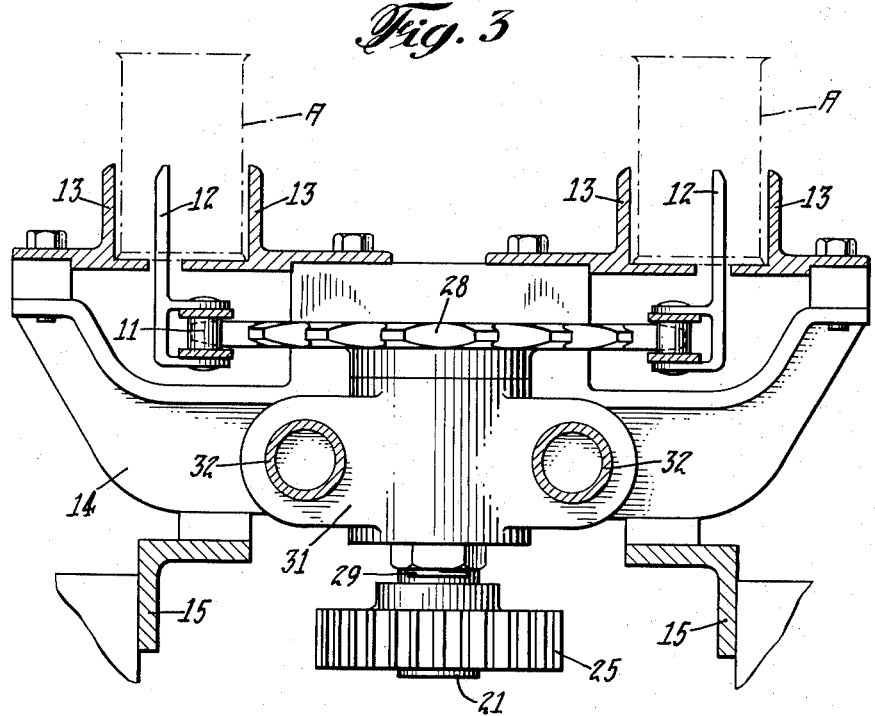

Oct. 9, 1951   R. E. J. NORDQUIST ET AL   2,570,264
CONVEYER MECHANISM WITH SUPPORTING SPROCKETS
Filed Feb. 27, 1948   2 Sheets-Sheet 1
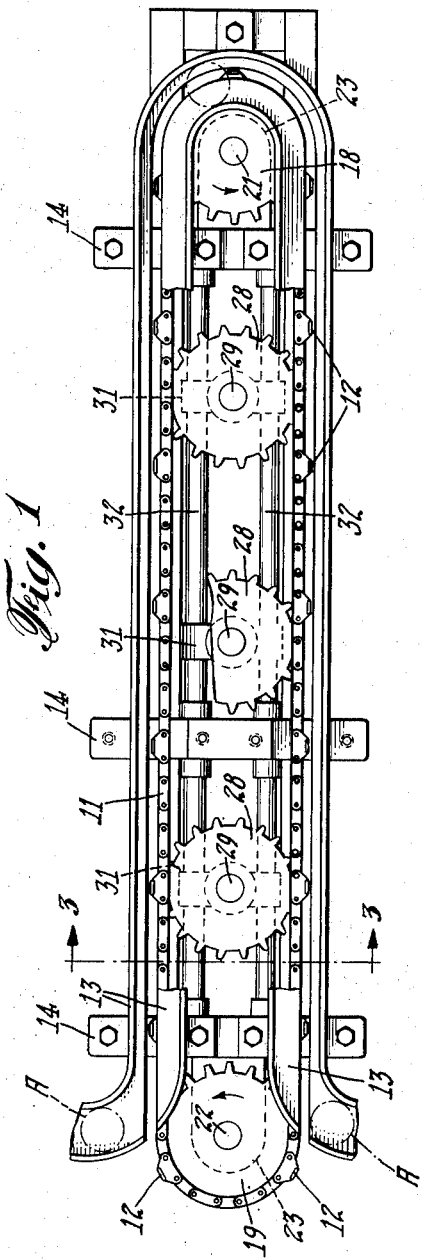
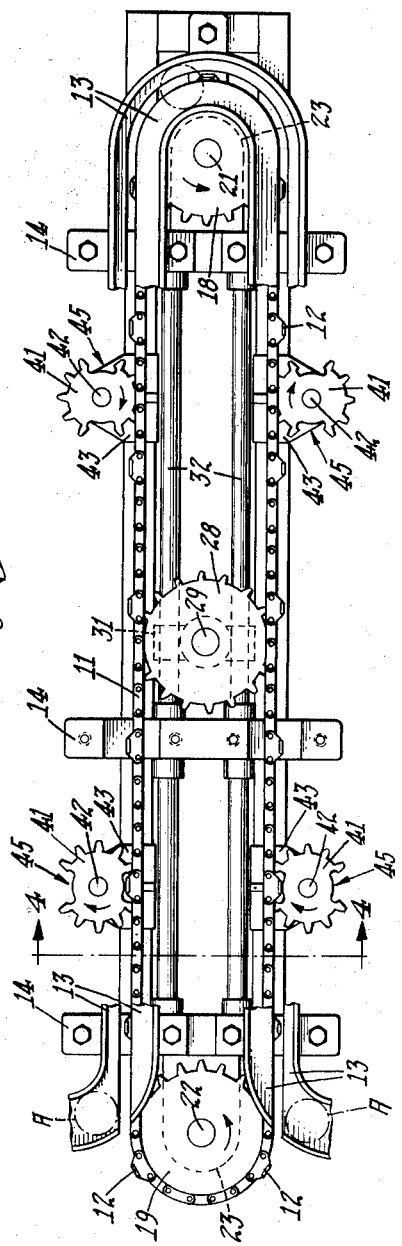
INVENTOR.
Ronald E. J. Nordquist
Felix Hunter
BY Ivan D. Thornburgh
Charles H. Lune
ATTORNEYS INVENTOR.
Ronald E. J. Nordquist
Felix Hunter
BY Ivan D. Thornburgh
Charles H. Ene
ATTORNEYS Patented Oct. 9, 1951

2,570,264

UNITED STATES PATENT OFFICE 2,570,264

CONVEYER MECHANISM WITH SUPPORTING SPROCKETS

Ronald E. J. Nordquist, Maplewood, and Felix Huntar, Livingston, N. J., assignors to American Can Company, New York, N. Y., a corporation of New Jersey Application February 27, 1948, Serial No. 11,777

2 Claims. (Cl. 198—137)

The present invention relates to an endless chain conveyor mechanism for propelling containers or cans and other articles along a path of travel and has particular reference to such a mechanism having supporting sprockets for maintaining the conveyor on a substantially perfect level. This is a companion application to my copending United States application Serial No. 11,776, filed February 27, 1948, and now Patent No. 2,561,404 granted July 24, 1951, on Filling and Closing Machine With Can and Cover Handling Devices.

An object of the invention is the provision in an endless chain conveyor mechanism of support sprockets wherein the conveyor intermediate its operating sprockets is supported against sagging so that such a conveyor may be disposed in a horizontal position while maintaining its longitudinal runs in a level condition.

Another object is the provision of such a support for a chain conveyor wherein the support sprockets are adapted to float relative to the conveyor to compensate for changes in the lengths of the longitudinal runs of the conveyor brought about by stretching of the chain or other causes.

Another object is the provision of such a support for a chain conveyor which is simple in construction and efficient in operation and which effects a minimum of wear on the chain.

Numerous other objects and advantages of the invention will be apparent as it is better understood from the following description, which, taken in connection with the accompanying drawings, discloses a preferred embodiment thereof.

Figure 4:
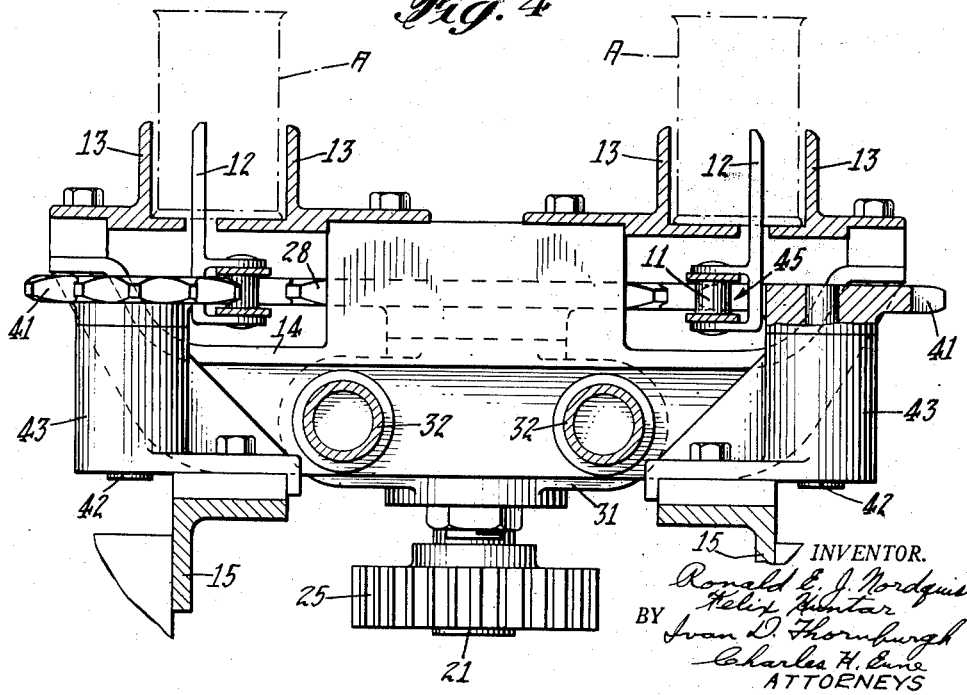

Referring to the drawings:

Figure 1 is a top plan view of a chain conveyor embodying the instant invention, with parts broken away;

Fig. 2 is a view similar to Fig. 1 and illustrating a modified form of the invention, with parts broken away; and Figs. 3 and 4 are enlarged transverse sectional views taken substantially along the respective lines 3—3, 4—4 in Figs. 1 and 2 respectively, the views showing in dotted lines, containers in place on the conveyors, with parts broken away.

As a preferred embodiment of the instant invention Figs. 1 and 3 of the drawings illustrate an endless chain conveyor 11 disposed in a horizontal position and having feed fingers 12 secured thereto at spaced intervals for propelling cans A along a predetermined path of travel defined by L-shaped guide rails or tracks 13 located adjacent the path of travel of the conveyor. The guide rails 13 are spaced apart sufficiently to permit of the passage of the feed fingers 12 between them. These guide rails are bolted to cross brackets 14 which in turn are secured to support members 15 which may constitute a portion of a more elaborate machine in which the conveyor is used.

The conveyor 11 operates over a pair of spaced horizontally disposed sprockets which include a driving sprocket 18 and an idler sprocket 19. These operating sprockets are mounted respectively on a driving shaft 21 and an idler shaft 22 which are journaled in bearings 23 formed on the two outer or end cross brackets 14. The driving shaft 21 is rotated in any suitable manner, as by a gear 25 (Fig. 3) carried on the lower end of the shaft.

Intermediate the operating sprockets 18, 19, the longitudinal runs of the conveyor 11 are supported against sagging by a plurality of spaced and rotatable support sprockets 28. The drawing shows three of these support sprockets although any number may be used depending upon the length of the conveyor and the desired spacing. These sprockets are idler sprockets and are mounted on the upper ends of short idler shafts 29 journaled in bearings formed in brackets 31 which surround and which are slidably carried on a pair of spaced and parallel hollow tubular slide members 32. These slide members extend through and are secured to the cross brackets 14. The support sprockets are disposed between and mesh with both of the longitudinal runs of the conveyor 11.

Hence as the conveyor 11 travels around its operating sprockets 18, 19, it rotates the support sprockets 28 and thus the support sprockets support the conveyor intermediate its operating sprockets against sagging and maintain the longitudinal runs of the conveyor in a level position. Thus the conveyor needs no other support or guide rails or other devices along which it would rub or slide and thus the wear and tear on the conveyor is reduced to a minimum.

Any change in the length of the conveyor due to expansion or contraction is compensated for by the sliding brackets 31. Since the sprockets are in mesh with both runs of the conveyor, they substantially maintain their relative positions but are capable of some floating action along the slide members 32 when one run of the conveyor for any reason becomes shorter or longer than the other. Thus a floating mounting for the sprockets is provided.

In a modified form of the invention as shown in Figs. 2 and 4, the longitudinal runs of the conveyor chain 11 are supported against sagging by being supported on the outside of these runs of the conveyor as well as the inside. For this purpose small auxiliary support sprockets 41 are interposed between the support sprockets 28 and the operating sprockets 18, 19 on the outside of the conveyor and mesh with and are driven by the outer portions of the longitudinal runs of the conveyor. These auxiliary support sprockets are carried on short vertical shafts 42 journaled in bearing brackets 43 (Fig. 4) bolted to the support members 15. The sprockets are formed with peripheral recesses 45 to clear the feed fingers 12 as they pass the sprockets.

With such a modified construction, fewer of the inner support sprockets 28 are required. In the drawings, Fig. 2, only one inner support sprocket 28 is shown in use with four outer auxiliary support sprockets 41 although the number of both inner and outer sprockets used depends upon the length of the conveyor. In any case the longitudinal runs of the conveyor are supported by both the inner and the outer support sprockets 28, 41 and thus are maintained in a level position so that sagging of the conveyor between its operating sprockets is prevented.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a conveyor mechanism, the combination of an endless chain conveyor disposed for operation in a horizontal position, a pair of spaced actuating sprockets mounted on vertical shafts for operating said conveyor, a support sprocket mounted for rotation on a vertical axis between said actuating sprockets and located between and meshing with the inner portions of two runs of said conveyor and supporting said runs of said conveyor against sagging between said actuating sprockets, and a floating mounting for said support sprocket to allow for change of position of the sprocket axis to compensate for changes in the length of said conveyor.

2. In a conveyor mechanism, the combination of an endless chain conveyor disposed for operation in a horizontal position, a pair of spaced actuating sprockets mounted on vertical shafts for operating said conveyor, a vertical support shaft, a support sprocket mounted on said support shaft and disposed between said actuating sprockets and located between and meshing with the inner portions of two runs of said conveyor and supporting said runs of said conveyor against sagging between said actuating sprockets, a slide member disposed adjacent said conveyor, and a floating bracket for carrying said support shaft, said bracket being slideably mounted on said slide member for positioning said support sprocket, said bracket being movable along said slide member by change of position of said sprocket to compensate for changes in the length of said conveyor.

RONALD E. J. NORDQUIST.
FELIX HUNTAR.

REFERENCES CITED

The following references are of record in the file of this patent:

UNITED STATES PATENTS

| Number | Name | Date |
| --- | --- | --- |
| 637,092 | Davy | Nov. 14, 1899 |